United States Patent
Nakatsuchi et al.

(10) Patent No.: US 8,972,226 B2
(45) Date of Patent: Mar. 3, 2015

(54) METHOD FOR ANALYZING GROWTH OF VOID OF RESIN IN A POROUS MATERIAL

(75) Inventors: Hiroki Nakatsuchi, Yokohama (JP); Tsutomu Kono, Kawasaki (JP); Keiji Suzuki, Hitachi (JP); Mitsuru Onoda, Takahagi (JP); Kazuo Goto, Mito (JP); Yasuaki Kageyama, Hitachi (JP); Takahiro Sato, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 485 days.

(21) Appl. No.: 13/226,528

(22) Filed: Sep. 7, 2011

(65) Prior Publication Data
US 2012/0095731 A1 Apr. 19, 2012

(30) Foreign Application Priority Data

Oct. 14, 2010 (JP) ................................. 2010-231764

(51) Int. Cl.
*G06G 7/48* (2006.01)
*G06G 7/56* (2006.01)
*G06F 17/50* (2006.01)

(52) U.S. Cl.
CPC ............. *G06F 17/5009* (2013.01); *Y02T 10/82* (2013.01); *G06F 17/5018* (2013.01); *G06F 2217/76* (2013.01)
USPC ........................................ 703/5; 703/2; 703/9

(58) Field of Classification Search
CPC . G06F 17/50; G06F 17/5018; B29C 45/7693; B29C 45/7646; B29C 45/7613; B29C 45/768; B29C 45/77; B29C 45/84
USPC ............................ 703/5, 9, 2; 374/57; 375/57
See application file for complete search history.

(56) References Cited

U.S. PATENT DOCUMENTS

2006/0004481 A1* 1/2006 Kono et al. .................... 700/200
(Continued)

FOREIGN PATENT DOCUMENTS

JP 2003-91561 3/2003
(Continued)

OTHER PUBLICATIONS

Chen, Dyi-Cheng, "Rigid-Plastic Finite Element Analysis of Plastic Deformation of Porous Metal Sheets Containing Internal Void Defects", 2006, Journal of Materials Processing Technology 180, Elsevier B.V.*
(Continued)

*Primary Examiner* — Kamini S Shah
*Assistant Examiner* — Cedric D Johnson
(74) *Attorney, Agent, or Firm* — Antonelli, Terry, Stout & Kraus, LLP.

(57) ABSTRACT

The present invention provides a method for analyzing growth of void of resin in a porous material which comprising the steps of inputting data of the shape of a porous material filled with a resin material, and dividing the shape of the porous material into three-dimensional solid elements; inputting physical properties of the porous material, and boundary conditions including a pressure that is applied to the porous material; obtaining a resin-density distribution in the porous material through fluid analysis using a database obtained by experimentally measuring in advance a temporal change in a volume of gas generated from the resin material and porous material during heating, changes in a compressive force and compressive displacement respectively occurring when the porous material impregnated with the resin is compressed, and a change in a flow resistance of the resin; and comprehensively grasping production, growth, and distribution of voids deriving from gas generation.

24 Claims, 10 Drawing Sheets

(56) References Cited

U.S. PATENT DOCUMENTS

2008/0234989 A1* 9/2008 Saeki et al. ............... 703/1
2011/0010137 A1* 1/2011 Yeh ............................ 703/2
2011/0112812 A1 5/2011 Kono et al.

FOREIGN PATENT DOCUMENTS

| | | |
|---|---|---|
| JP | 2006-18616 | 1/2006 |
| JP | 2006-168300 | 6/2006 |
| JP | 2008-230089 | 10/2008 |
| JP | 2009-233882 | 10/2009 |
| JP | 2011-103089 | 5/2011 |

OTHER PUBLICATIONS

Kardos, J.L. et al., "Void Growth and Resin Transport During Processing of Thermosetting—Matrix Composites", 1986, Advances in Polymer Science 80, Springer-Verlag Berlin Heidelberg.*

* cited by examiner

METHOD FOR ANALYZING GROWTH OF VOID OF RESIN IN A POROUS MATERIAL

RELATED APPLICATION

The present application is an application claiming priority based on Patent Application No. 2010-231764 filed on Oct. 14, 2010 in Japan.

BACKGROUND

The present invention relates to a resin impregnation and molding technology for porous material of interposing a porous material, which is mica or a glass fiber, between a solid member and another member. In particular, the present invention is concerned with a method for analyzing growth of void of resin in porous material suitable for a three-dimensional fluid analysis technique and capable of comprehensively estimating production, growth, fluid behavior, and distribution of voids in a resin in a porous material in the course of impregnating and molding the porous material.

As related arts concerning a resin fluidity analysis modeling method for porous material employed in impregnating and molding a porous material, there are related arts described in Japanese Patent Application Laid-Open Publication Nos. 2008-230089 and 2006-168300. As a void-production estimation method for a resin-molded product, there is a method described in Japanese Patent Application Laid-Open Publication No. 2009-233882.

Japanese Patent Application Laid-Open Publication No. 2008-230089 has disclosed, in relation to a resin flow in a porous material, a technology for a calculation method of inputting a three-dimensional pressure loss as a product of a cross-sectional specific resistance representing a flow resistance, a viscosity, a velocity, and a flow distance.

Japanese Patent Application Laid-Open Publication No. 2006-168300 has disclosed, in relation to a resin flow in a porous material, a technology of modeling and calculating an impregnated state of a substrate on the basis of the Darcy formula.

Japanese Patent Application Laid-Open Publication No. 2009-233882 has disclosed, in relation to production of voids in a resin-molded product, a technology of obtaining an elasticity of a resin and a contractile force thereof from the resin temperature in a microscopic element, and estimating voids through structural analysis.

A method of impregnating a porous material with a resin and molding the resultant medium is adopted for a stator coil insulation layer of a power generator or a motor, or blades of a wind generator. The impregnated molded product is characteristic of being lightweight and highly strong, and the application range thereof is expanded even to an airplane chassis.

When voids are generated in a resin to be made into an insulation layer, if a high pressure is applied, discharge occurs through the voids. This leads to dielectric breakdown. If voids are generated in a resin in a fiber-reinforced plastic (FRP) product that is a lightweight and highly strong impregnated molded product, such as, blades of a wind generator, the voids originate breakdown. This poses a problem in that the strength of the FRP product is markedly degraded. Production and growth of voids are attributable to gas generated at the time of heating a porous material in which an organic solvent remains, a solid member that contains an organic substance and adjoins the porous material and a resin, and a resin material. In order to minimize generation of voids due to the gas generated from the porous material or solid member, it is necessary to review modification of a drying process preceding resin impregnation, modification of conditions for a resin heating and curing process, changing of the materials of the porous material and solid member respectively. However, it costs high to experimentally review the above contents, and prolongs a development period. Therefore, development of an analysis technology capable of comprehensively estimating production, growth, fluid behavior, and distribution of voids in a resin is needed. Using the analysis technology, conditions under which production of voids is minimized have to be determined.

As for the related arts, Japanese Patent Application Laid-Open Publication Nos. 2008-230089 and 2006-168300 describe fluidity analysis of a resin in a porous material, but do not mention an analysis method for analyzing generation, growth, fluid behavior, and distribution of voids occurring in the course of heating and curing of the resin. In addition, the patent document 3 describes analysis of production of voids due to contraction of a resin, but does not mention an analysis method for analyzing production of voids due to generation of gas from the porous material, a solid member, and the resin.

SUMMARY

An object of the present invention is to provide a method for analyzing growth of void of resin in a porous material which makes it possible to comprehensively estimate production, growth, fluid behavior, and distribution of voids in a resin in the course of impregnating a porous material with the resin and molding the resultant porous material.

In order to accomplish the above object, according to one aspect of the present invention, changes in an amount of gas, which is generated when a porous material, a solid member, and a resin are heated, with respect to a time and temperature respectively, changes in a compressive force and a compressive displacement respectively occurring when the porous material filled with or impregnated with a resin is compressed, and a change in a flow resistance of the resin are experimentally measured in advance, and used as an input for analysis. An extent of production and growth of voids deriving from gas generation is incorporated in a general-purpose fluid analysis program as a decrease in an apparent resin density in each of finite elements for analysis. Thus, the production, growth, fluid behavior, and distribution of voids in the resin observed when the porous material filled or impregnated with the resin is heated and compressed can be comprehensively estimated.

At this time, a resin viscosity is expressed by a relational equation that specifies at least a resin temperature. A change in the resin viscosity due to heating of a resin material is calculated, and a volume of gas from a porous material and solid member is calculated. Namely, when the resin viscosity rises, even if the gas is generated, an effect of suppressing an increase in the volume of voids owing to a viscous property is exerted.

In addition, a flow resistance of a porous material is expressed by a function of a cross-sectional specific resistance and a resin viscosity. A change in the flow resistance due to heating and compression of the porous material containing a resin is calculated, and a volume of gas from the porous material, a solid member, and a resin material is calculated. Specifically, along with compression of the porous material, an aperture ratio of the porous material is decreased and the cross-sectional specific resistance is increased. In addition, the viscosity of the resin increases due to heating, and the flow resistance rises accordingly. Thus, an effect of suppressing an increase in the volume of voids is exerted.

Further, a change in a thermal conductivity of a resin deriving from production of voids is incorporated as a function of an apparent resin density in each of finite elements, and assigned to an energy equation so as to calculate the resin temperature.

In order to accomplish the object, according to another aspect of the present invention, there is provided an analysis method for comprehensively grasping production, growth, and distribution of voids that are generated in a porous material, which is impregnated with a resin material, by heating and compressing the porous material, which is impregnated with the resin material, using molds. Herein, data of the shape of the porous material filled with the resin material is inputted, and the shape of the porous material is divided into three-dimensional solid elements on the basis of the inputted shape data. Physical properties of the porous material filled with the resin material, and boundary conditions including a pressure to be applied to the porous material with the molds are inputted. A database obtained by experimentally measuring in advance a temporal change in the volume of gas generated from the resin material and porous material during heating, changes in a compressive force and a compressive displacement respectively occurring when the porous material impregnated with the resin is compressed, and a change in the flow resistance of the resin is used to obtain a resin-density distribution in the porous material, which is divided into the three-dimensional solid elements, through fluid analysis. Production, growth, and distribution of voids deriving from gas generation are comprehensively grasped based on the apparent resin-density distribution in each of the three-dimensional solid elements.

In order to accomplish the object, according to another aspect of the present invention, there is provided a method of analyzing a distribution of voids that are generated in a porous material by heating and compressing the porous material, which is impregnated with a resin material, with molds. Herein, the shape of the porous material filled with the resin material is divided into three-dimensional solid elements. Physical properties of the porous material filled with the resin material, and boundary conditions including a pressure to be applied to the porous material with the molds are inputted. A database obtained by experimentally measuring in advance a temporal change in a volume of gas generated from the resin material during heating of the porous material with the molds is used to obtain a resin-density distribution in the porous material, which is divided into the three-dimensional solid elements, through fluid analysis. The obtained resin-density distribution in the porous material divided into the three-dimensional solid elements is displayed on a screen side by side with a resin-density distribution in the porous material obtained before the pressure is applied with the molds.

The aspects of the present invention enables analysis of growth of voids in a resin in a porous material through which production, growth, fluid behavior, and distribution of the voids in the resin in the porous material can be comprehensively estimated. By employing the analysis technique, production of voids due to gas generated from the porous material and a solid member can be minimized. Modification of a drying process preceding resin impregnation and being intended to sustain quality, modification of conditions for a resin heating and curing process, and changing of the materials of the porous material and solid member can be achieved in the course of analysis. Eventually, improvement in reliability of a product, shortening of a test production period, and minimization of a cost of test production can be realized.

These features and advantages of the invention will be apparent from the following more particular description of preferred embodiments of the invention, as illustrated in the accompanying drawings.

DESCRIPTION OF THE PREFERRED EMBODIMENTS

Referring to the appended drawings, embodiments of the present invention will be described below.

To begin with, an example of a molding process for an object of analysis will be described in conjunction with FIGS. 1A to 1C.

Figure 1A:
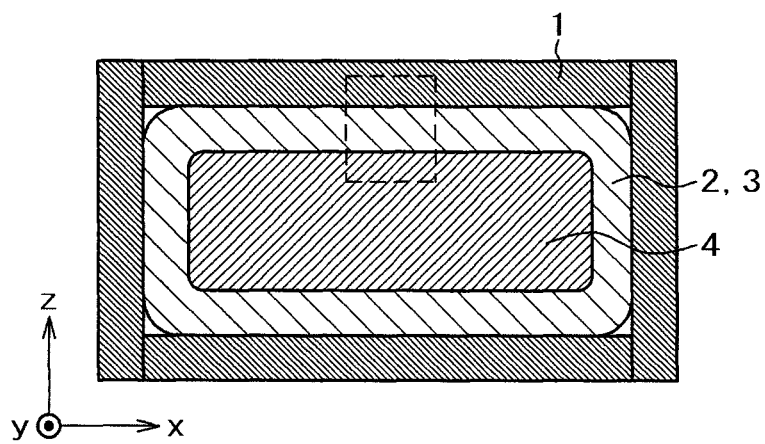
FIG. 1A is a front view of the whole of an object of molding showing an example of molding a porous material filled with a resin is molded.
Figure 1B:
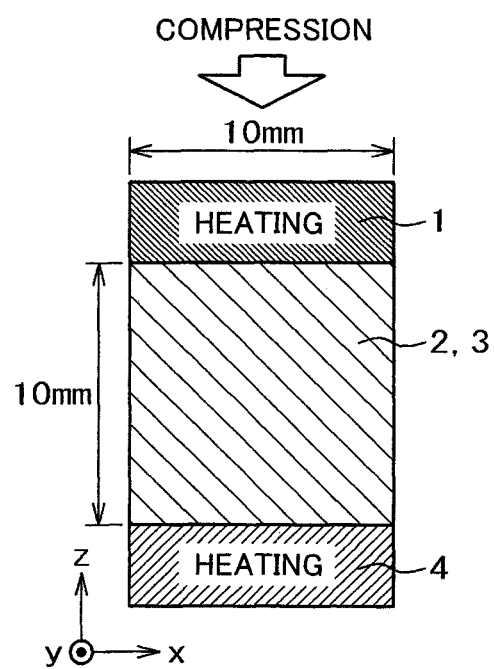
FIG. 1B is a partially enlarged diagram of a region, which is indicated with a dashed line in FIG. 1A, in a state attained before molding is performed.
Figure 1C:
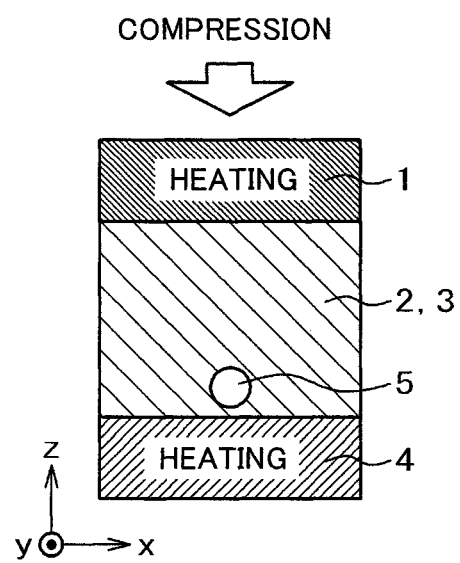
FIG. 1C is a partial enlarged diagram of the region, which is indicated with the dashed line in FIG. 1A, in a state attained after the molding is performed.
Figure 10:
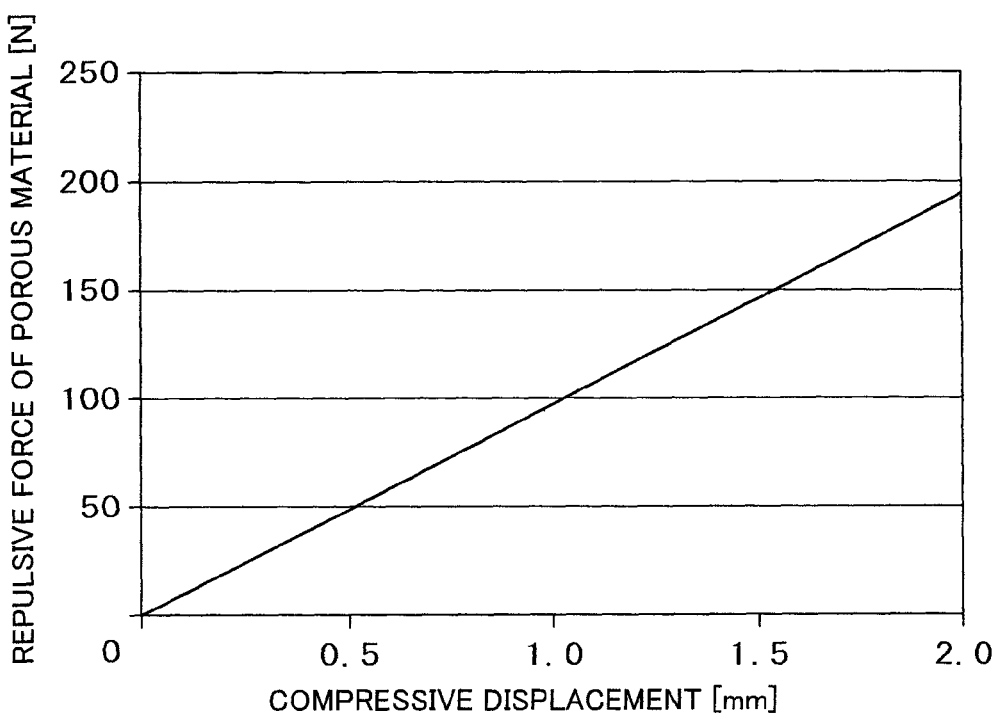
FIG. 10 is a graph expressing a relationship between the compressive force and compressive displacement to be established when the porous material is compressed in the analytic example 1.

FIG. 1A shows the whole of an object. FIG. 1B and FIG. 10 show a portion, which is delineated with a dashed line in FIG. 1A, in states attained before and after molding is performed. In FIG. 1A showing an object of analysis, a porous material 3 filled or impregnated with a resin material 2 is placed on the periphery of a solid member 4. A press 1 is disposed on the outer circumference of the porous material 3. As an example of a molding process, the press 1 and solid member 4 are, as shown in FIG. 1B, heated, and the press 1 is compressed with a pressure applied thereto. Thus, the porous material 3 and resin material 2 are compressed and cured, and molded. In case an organic solvent subsists in the solid member 4, porous material 3, or resin material 2, the organic solvent is vaporized due to heating. Voids 5 are, as shown in FIG. 10, generated. In order to comprehensively grasp production, growth, and fluid behavior of the voids 5, an increase in the number of voids 5 is modeled as a decrease in a resin density in each of finite elements.

Figure 2:
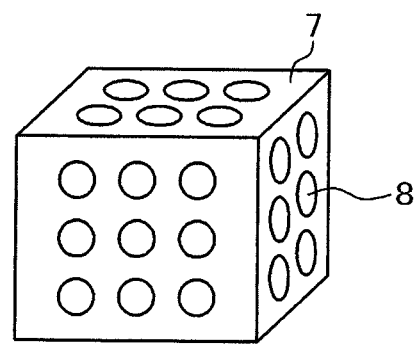
FIG. 2 is a perspective diagram showing a model of a resin poured into a porous material.

As an example of the shape of a model of the porous material 3, a model shape shall have, as shown in FIG. 2, numerous holes 8 formed in a substrate 7. The holes are filled or impregnated with the resin material 2. A flow resistance of the resin material 2 in the porous material 3 is inputted as a function of a cross-sectional specific resistance and a viscosity. A cross-sectional specific resistance change equation and a viscosity change equation are inputted so that the cross-sectional specific resistance and viscosity can change mutually independently along with application of a pressure to the press 1 and heating of the press 1. Incidentally, the porous material 3 may not be a structure represented by the model shape in FIG. 2 but may be any structure including a substrate and voids.

As the material of the porous material 3, mica, a glass fiber, or the like may be adopted. As the resin material 2, a thermosetting resin such as an epoxy resin or a phenol formaldehyde (PF) resin, or a thermoplastic resin such as polycarbonate or polystyrene can be adopted.

Next, an analysis system for use in comprehensively estimating production, growth, fluid behavior, and distribution of voids will be described below. The analysis system is functioned by executing process steps, which are described in the flowchart of FIG. 4 to be mentioned later, in a hardware configuration shown in FIG. 3.

More particularly, the analysis system includes a computer 10 having a display unit 11, a recording unit 12 (hard disk), an output/input unit 13, and an arithmetic unit 14. The computer 10 includes an input device such as a keyboard and a mouse, though the input device is not shown in the drawing.

Embodiment 1

Next, a processing method implemented in an analysis program will be described according to the flowchart of FIG. 4.

First, at model shape creation step 1001, an object of analysis, that is, the shape of the press 1, the shape of the porous material 3 filled with the resin material 2, and the shape of the solid member 4 are entered at the output/input unit 13 by an operator.

Figure 3:
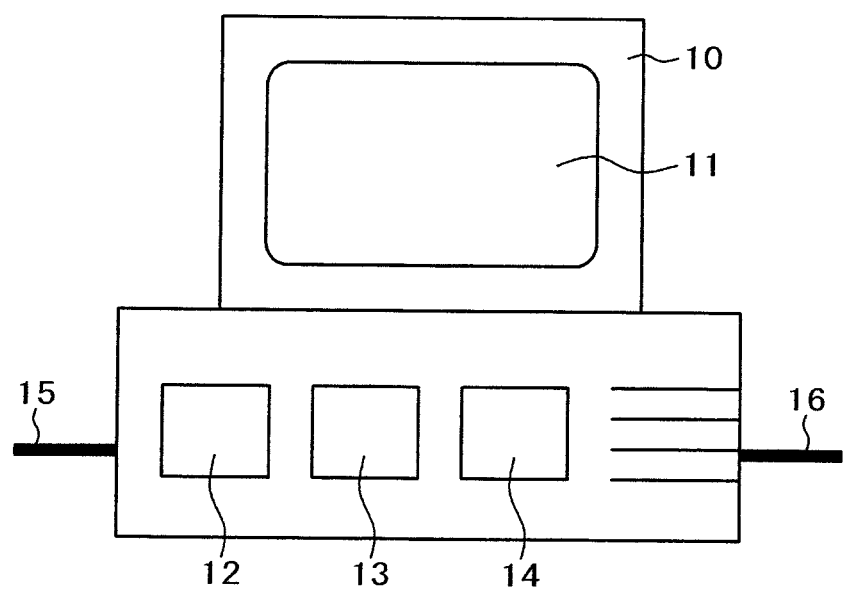
FIG. 3 is a block diagram showing the configuration of hardware that performs analysis.

As for inputting of the shapes, computer-aided design (CAD) data or the like may be externally read via the output/input unit 13 over a local-area network (LAN) 15 or through a universal serial bus (USB) terminal 16 shown in FIG. 3, and inputted to the recording unit 12.

Thereafter, at three-dimensional element creation step 1002, a model shape created at step 1001 are divided into plural specific spaces (three-dimensional solid finite elements) in order to create shape data items of respective finite elements.

Next, at physical property input step 1003, display is made on the screen of the display unit 11 in order to prompt the operator to enter at least such physical properties as a density, an initial thermal conductivity, and a specific heat concerning the resin material 2, a density, an initial cross-sectional specific resistance, an initial aperture ratio, a specific heat, and a thermal conductivity concerning the porous material 3, and a density, a specific heat, and a thermal conductivity concerning gas generated from the porous material 3, solid member 4, and resin material 2. Data is received at the output/input unit 13.

Thereafter, at boundary conditions and molding conditions input step 1004, display is made on the screen of the display unit 11 in order to prompt the operator to enter a temperature change of the solid member 4, an initial temperature of the porous material 3, an initial temperature and initial pressure of the resin material 2, a temperature change and initial moving speed of the press 1, and a pressure to be applied to the press 1. Data is then received at the output/input unit 13. Thereafter, display is made on the screen of the display unit 11 in order to prompt the operator to enter an initial time increment and analysis end time tE. Data is then received at the output/input unit 13. In analysis, a short time is incremented, and a change observed at each time step is calculated. What is referred to as the time increment is an interval between time steps.

Thereafter, at step 1005, display is made on the screen of the display unit 11 in order to prompt the operator to enter data extracted from a database containing measured values of an amount of gas generated from the porous material 3, solid member 4, and resin material 2, changes in a repulsive force and compressive displacement respectively occurring when the porous material 3 is compressed, and changes in a cross-sectional specific resistance and compressive displacement respectively occurring when the porous material 3 is compressed. The data extracted from the database is received at the output/input unit 13.

Figure 5:
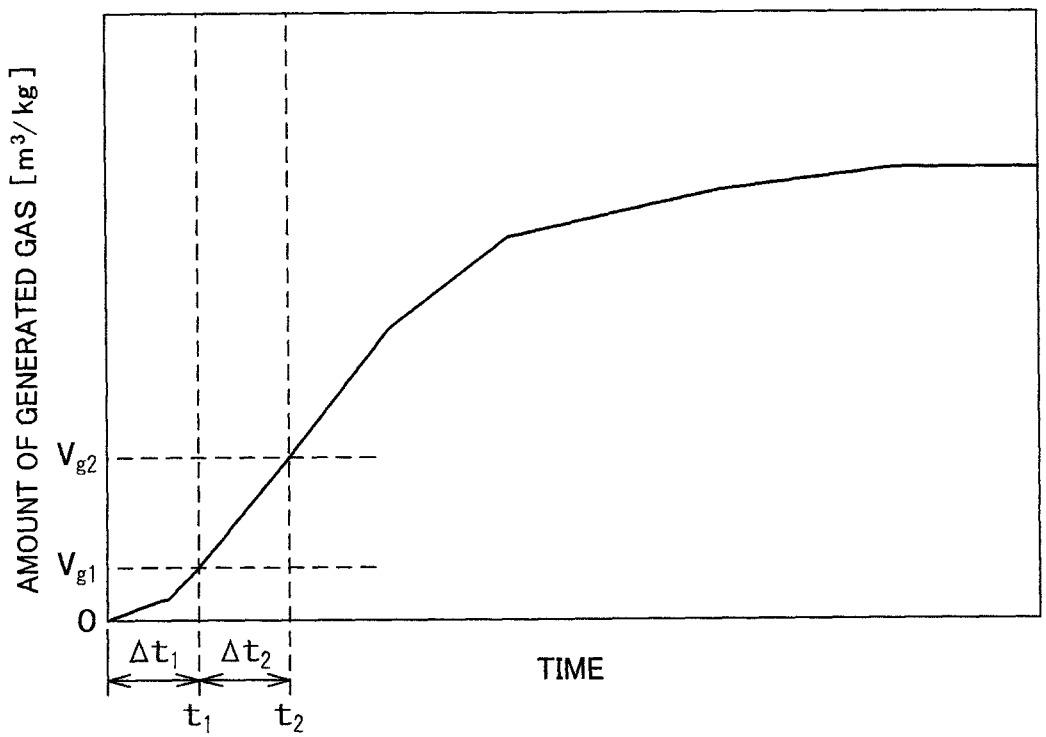
FIG. 5 is a graph expressing an example of measured values of a time-sequential change in an amount of gas generated from a resin material, a porous material, and a solid member.

FIG. 5 shows an example of measured values of an amount of gas generated from the porous material 3, solid member 4, and resin material 2. In this case, an experimentally measured amount of a sole gas or a sum of experimentally measured amounts of gases is indicated with a graph expressing a temporal change in a gas volume per unit weight of at least one of the porous material 3, solid member 4, and resin material 2.

Figure 6:
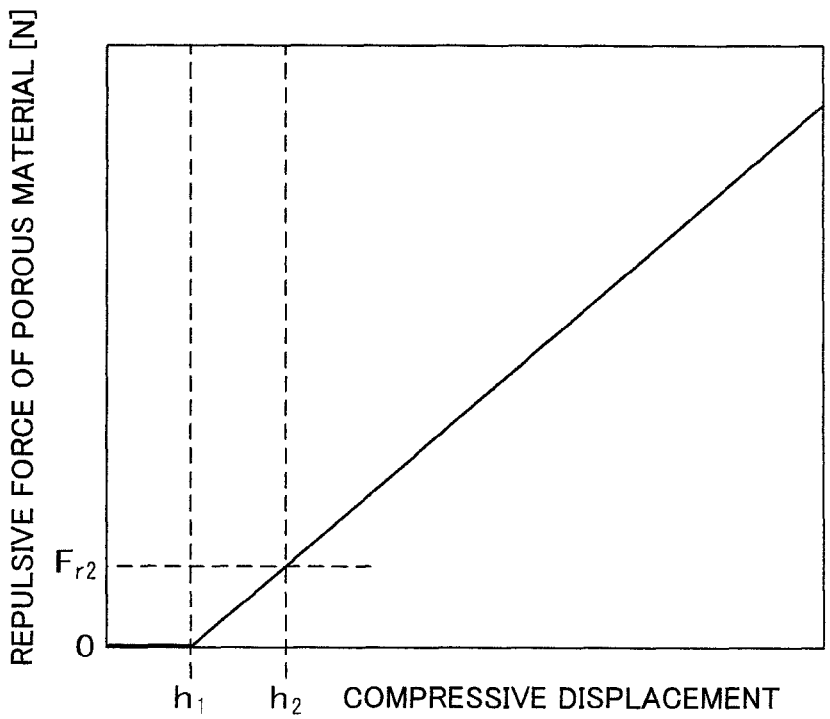
FIG. 6 is a graph expressing an example of changes in a compressive force and a compressive displacement respectively occurring when the porous material is compressed.

FIG. 6 shows an example of changes in a repulsive force and compressive displacement respectively of the porous material 3 occurring when the porous material 3 is compressed. In this case, the relationship between the repulsive force and compressive displacement of the porous material 3 observed when a compressive force is applied to the porous material 3 is experimentally obtained and stored to form a database. Incidentally, a gas component shall be an organic substance such as water, toluene, or acetone.

Figure 7:
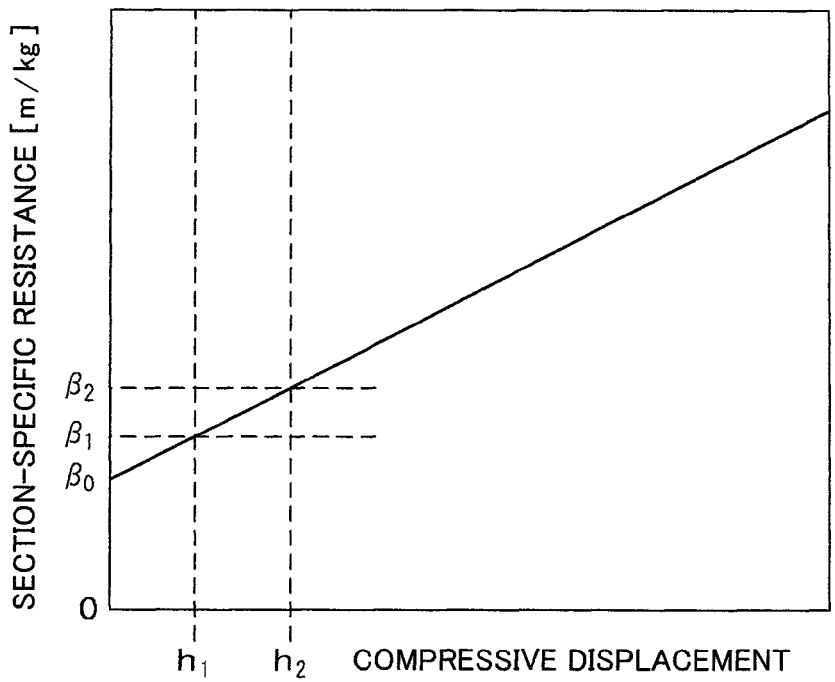
FIG. 7 is a graph expressing an example of changes in a cross-sectional specific resistance and a compressive displacement respectively occurring when the porous material is compressed.

FIG. 7 shows an example of changes in a cross-sectional specific resistance and compressive displacement respectively occurring when the porous material 3 is compressed. In this case, the cross-sectional specific resistance observed when a compressive displacement is applied is experimentally and analytically obtained, and the relationship between the cross-sectional specific resistance and the compressive displacement is expressed. The cross-sectional specific resistance shall be independently designated and varied for at least two directions, that is, a thickness direction and a direction perpendicular to the thickness direction.

In the data inputted from the database, not only linear behavior shown in FIG. 6 or FIG. 7 but also nonlinear behavior can be extracted by finely defining calculation points and approximating an interval between two calculation points with a function.

At step 1006, using the received physical properties, boundary conditions, molding conditions, and the experimentally obtained database, the arithmetic unit 10 calculates heat dissipation and viscosity of the resin material 2 and flow resistance of the porous material 3 at a time increment $\Delta t1$ from a time t=0 to an arbitrary time t=t1 at the first calculation step by using heat dissipation equations and a viscosity equation of the resin material 2, and a flow resistance change equation concerning the porous material 3.

Now, the heat dissipation equations concerning the resin material 2 include equations (1) to (5) below.

$$\frac{dA}{dt} = (k_1 + k_2 A^M)(1-A)^N \quad \text{(Equation 1)}$$

$$A = \frac{Q}{Q_0} \quad \text{(Equation 2)}$$

$$\frac{dQ}{dt} = Q_0(k_1(T) + k_2(T) \cdot A^M)(1-A)^N \quad \text{(Equation 3)}$$

$$k_1 = k_a \exp\left(-\frac{l_1}{T}\right) \quad \text{(Equation 4)}$$

$$k_2 = k_b \exp\left(-\frac{l_2}{T}\right) \quad \text{(Equation 5)}$$

where, A denotes a reaction rate, t denotes a time, T denotes a temperature, dA/dt denotes a reaction velocity, k1 and k2 denote coefficients that are functions of temperature, M, N, ka, kb, 1a, and 1b denote material-specific constants, Q denotes a heat quantity dissipated by an arbitrary time, and Q0 denotes a total heat quantity dissipated by termination of reaction.

The viscosity equation concerning the resin material 2 is provided as an equation (6) presented below, and involves equations (7) to (9) presented below.

$$\eta(t, T) = \eta_0(T)\left(\frac{1 + t/t_g \cdot (T)}{1 - t/t_g(T)}\right)^{D(T)} \quad \text{(Equation 6)}$$

$$\eta_0(T) = a \exp\left(\frac{b}{T}\right) \quad \text{(Equation 7)}$$

$$t_g(T) = d \exp\left(\frac{e}{T}\right) \quad \text{(Equation 8)}$$

$$D(T) = \frac{i}{T} - j \quad \text{(Equation 9)}$$

where $\eta$ denotes a viscosity, $\eta 0$ denotes an initial viscosity, tg denotes a gelation time, t denotes a time, T denotes a temperature, D denotes a coefficient that is a function of temperature, and a, b, d, e, i, and j denote material-specific constants. The equation (6) shall be able to be expressed as a function of at least the resin temperature.

The flow resistance change equation concerning the porous material 3 is provided as an equation (10) below.

$$K(t,T,h) = \eta(t,T) \cdot \beta(h) \quad \text{(Equation 10)}$$

where K denotes a flow resistance, $\beta$ denotes a cross-sectional specific resistance, and h denotes a compressive displacement of the porous material 3. In calculating at an initial time increment $\Delta t1$, $\beta$ is set to an initial value. The cross-sectional specific resistance $\beta$ can be independently designated for three mutually orthogonal directions. By defining the $\beta$ value, a flow resistance for each of the directions can be obtained.

At step 1007, first, an amount of gas vg1 generated during the time increment $\Delta t1$ from the time t=0 to arbitrary time t=t1 at the first calculation step is obtained from measured values of the amount of gas, which is generated from at least one of the porous material 3, solid member 4, and resin material 2, inputted at step 1005 and graphically shown in FIG. 5. Further, a gas-occupied volume Vg in each of the finite elements created at step 1002 is expressed by an equation (11) below.

$$V_g = v_1 \cdot p_p \cdot (1-f(h)) \cdot V_m \quad \text{(Equation 11)}$$

where $p_p$ denotes a density of the porous material 3, f denotes an aperture ratio of the porous material 3, and Vm denotes a volume of a finite element.

The gas-occupied volume Vg of one finite element may vary depending on a difference between a resin pressure near a void and an internal gas pressure, a cross-sectional specific resistance of the porous material 3, or a resin viscosity of the resin material 2. For example, the gas-occupied volume Vg is corrected according to equations (12) to (15) below.

$$V'_g = V_g \cdot g_1(\eta) \cdot g_2(P_i) \cdot g_3(\beta) \quad \text{(Equation 12)}$$

$$g_1(\eta) = \alpha_1 \exp\left(\frac{\alpha_2}{\eta}\right) \quad \text{(Equation 13)}$$

$$g_2(P_i) = \alpha_3 \exp\left(\frac{\alpha_4}{P_i}\right) \quad \text{(Equation 14)}$$

$$g_3(\beta) = \alpha_5 \exp\left(\frac{\alpha_6}{\beta}\right) \quad \text{(Equation 15)}$$

where Vg' denotes a corrected gas-occupied volume, $\eta$ denotes a viscosity, Pi denotes a difference between the resin pressure near a void and internal gas pressure, $\beta$ denotes a cross-sectional specific resistance, and $\alpha 1$, $\alpha 2$, $\alpha 3$, $\alpha 4$, $\alpha 5$, and $\alpha 6$ denote constants to be designated for each function. The constants $\alpha 1$ to $\alpha 6$ can be designated through behavior analysis of a sole void.

The equation (12) shall be able to be expressed as a function of at least the resin viscosity, the difference between the resin pressure near a void and internal gas pressure, and the cross-sectional specific resistance. The aperture ratio f of the porous material 3 is expressed by an equation (16).

$$f(h) = \frac{H \cdot f_0 - h}{H - h} \quad \text{(Equation 16)}$$

where H denotes an initial thickness of the porous material 3, f0 denotes an initial aperture ratio of the porous material 3, and h denotes a compressive displacement of the porous material 3.

In calculating at the time increment $\Delta t1$ at the first calculation step, the aperture ratio f is set to the initial value f0. At the second calculation step or a subsequent step, the h value obtained at an immediately previous calculation step is used for calculation. Thus, the aperture ratio f is updated. Further, an apparent resin density $p_A$ of each finite element is expressed by an equation (17) below.

$$\rho_A = \rho_r - \frac{(\rho_r - \rho_g) \cdot V_g}{f(h) \cdot V_m}. \quad \text{(Equation 17)}$$

where $p_r$ denotes a density of the resin material 2, $p_g$ denotes a gas density, and $V_g$ denotes a gas-occupied volume of each finite element.

From the equation (17), $p_r > p_g$ is established. Namely, voids are produced due to generation of gas, and the gas-occupied volume $V_g$ of the finite element increases. Eventually, the apparent resin density $p_A$ in the finite element decreases.

A thermal conductivity $\lambda$ of a resin attained along with production of voids is expressed by an equation (18) below.

$$\lambda = \lambda_0 \left(\frac{\rho_A}{\rho_r}\right)^E \quad \text{(Equation 18)}$$

where $\lambda 0$ denotes an initial thermal conductivity of the resin material 2, and E denotes a material-specific constant. The equation (18) shall be able to be expressed as a function of at least an initial thermal conductivity and a density.

At step 1008, a compressive force F that acts on the resin material 2 is obtained by calculating a difference (F=Fc−Fr) between a pressure Fc applied to the press 1 at step 1004 and a repulsive force Fr that is inputted at step 1005 and exerted when the porous material 3 is compressed. During the time increment Δt1 at the first calculation step, the repulsive force Fr is set to an initial value. At the second calculation step or a subsequent step, the h value obtained at an immediately previous calculation step is used for calculation. Thus, the compressive force is updated.

At step 1009, an equation of continuity (equation 19), an equation of motion (equation 20), and an energy conservation equation (equation 21) stored in the arithmetic unit 10 are read out. The initial time increment, physical properties, boundary conditions, molding conditions, heat dissipation equations (equations 1 to 3), viscosity equation (equation 6), flow resistance change equation (equation 10), gas-occupied volume $V_g$ in a finite element (equation 11), aperture ratio f of the porous material 3 (equation 16), apparent resin density $p_A$ in the finite element (equation 17), resin thermal conductivity change equation (equation 18), and compressive force F acting on the resin material 2, which are inputted or calculated at steps 1003 to 1008, are assigned to the above equations in order to calculate a velocity, temperature, and pressure of a resin. The results of the calculation are stored in the recording unit 8 in association with the position of the finite element.

$$\nabla \cdot u = 0 \quad \text{(Equation 19)}$$

$$\frac{\partial u}{\partial t} + u \cdot \nabla u = -\frac{1}{\rho_A}\nabla P + \frac{\eta(t,\tau)}{\rho_A}\nabla^2 u + G - K(t,T,h) \cdot u \quad \text{(Equation 20)}$$

$$\rho_A C\left(\frac{\partial T}{\partial t} + u \cdot \nabla T\right) = \lambda \nabla^2 + \rho_A \frac{dQ}{dt} + \eta \gamma^2 \quad \text{(Equation 21)}$$

where u denotes a velocity, t denotes a time, T denotes a temperature, P denotes a pressure, $\rho_A$ denotes an apparent resin density in a finite element, $\eta$ denotes a viscosity, G denotes a gravitational acceleration, C denotes a specific heat, $\lambda$ denotes a thermal conductivity, Q denotes a heat quantity, y denotes a shear velocity, and K denotes a flow resistance of the porous material 3.

At step 1010, a compressive displacement h of the porous material 3 is calculated based on the results of fluidity calculation at step 1009. Herein, the h value varies until the press 1 stops working because of a rise in the viscosity of the resin material 2 and an increase in the repulsive force of the porous material 3 or until the aperture ratio f of the porous material 3 becomes null. At step 1011, a decision is made on whether the time t in analysis is shorter than the designated analysis end time $t_E$. If the decision is No, the analysis is terminated and the procedure proceeds to the next step. In contrast, if the decision is Yes, the procedure returns to the calculation of step 1006, and calculation for the next time increment Δt2 is carried out.

For the next time increment, at step 1006, the compressive displacement h calculated at step 1010 and the cross-sectional specific resistance β obtained from the database inputted at step 1005 (FIG. 7) are employed.

If the analysis is terminated at step 1011, the operator is prompted to output the results of calculation at step 1012, and the results of calculation are displayed on the display unit 11.

Analytic Example 1

An analytic example employing the foregoing analysis method will be described below. An analytic range includes the porous material 3 filled with the resin material 2 that is of a 10 mm square as shown in FIG. 1B, and the press 1 and solid member 4 that are in contact with the porous material 3. Both ends of the analytic range in an x direction of the porous material 3 filled with the resin material 2 are coupled to each other, and are designated as symmetrical boundaries. In contrast, both ends in a y direction of the porous material 3 in the analytic range are defined by the press 1 and the solid member 4, and boundaries are defined so that the internal resin material 2 can freely flow out by the compression of the porous material 3.

For analysis, values listed in table 1 are adopted as the physical properties of the resin material 2, porous material 3, and generated gas; such as, densities, specific heats, and thermal conductivities thereof. Values listed in table 2 are adopted as constants in the thermal conductivity change equation (equation 18). Values listed in table 3 are adopted as constants in the viscosity equation and relevant equations (equations 6 to 9). The heat dissipation equations (equations 1 to 3) and the amount-of-generated gas correction equation and relevant equations (equations 12 to 15) are not applied. In addition, the initial temperature of the porous material 3 filled with the resin material 2 is set to 35° C., and the temperature of the press 1 and solid member 4 is fixed to 180° C. The initial aperture ratio of the porous material 3 is set to 0.5.

TABLE 1

|  | Density[kg/m³] | Specific heat [J/(kg/K)] | Thermal conductivity [W/(m · K)] |
|---|---|---|---|
| Porous material | 3000 | 860 | 0.67 |
| Resin material | 1000 | 1000 | 0.2 |
| Gas | 1.2 | — | 0.03 |

TABLE 2

| $\lambda_0$ | $P_r$ | E |
|---|---|---|
| 0.2 | 1000 | 7.5 |

TABLE 3

| a | b | d | e | i | j |
|---|---|---|---|---|---|
| 3.90E-9 | 6685.976 | 1.56e-8 | 9569.935 | 2515 | 4.48 |

Figure 8:
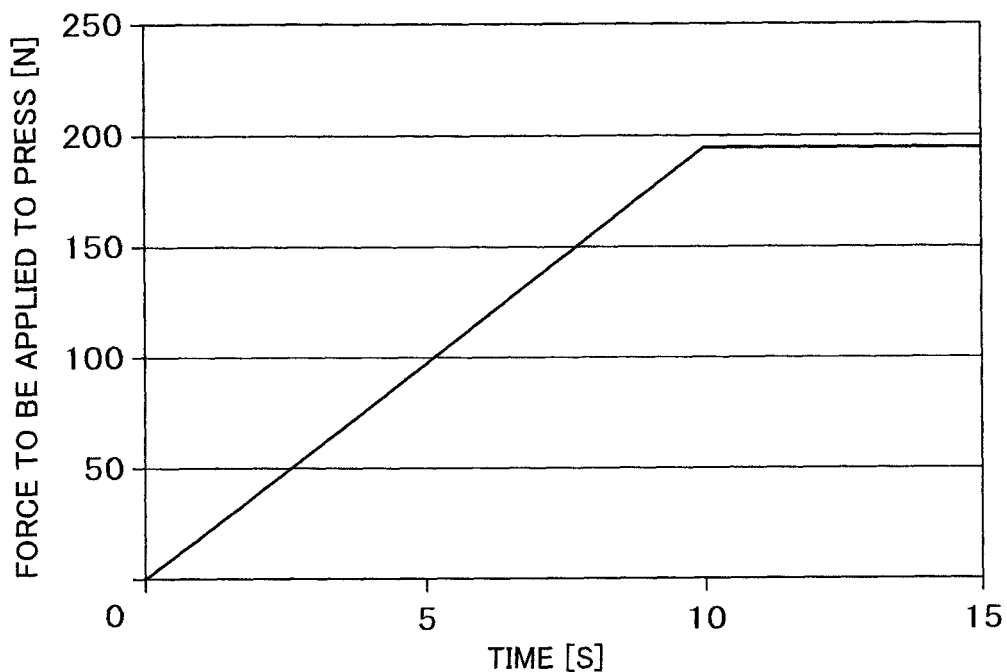
FIG. 8 is a graph expressing a temporal change in a force applied to a press in an analytic example 1.
Figure 9:
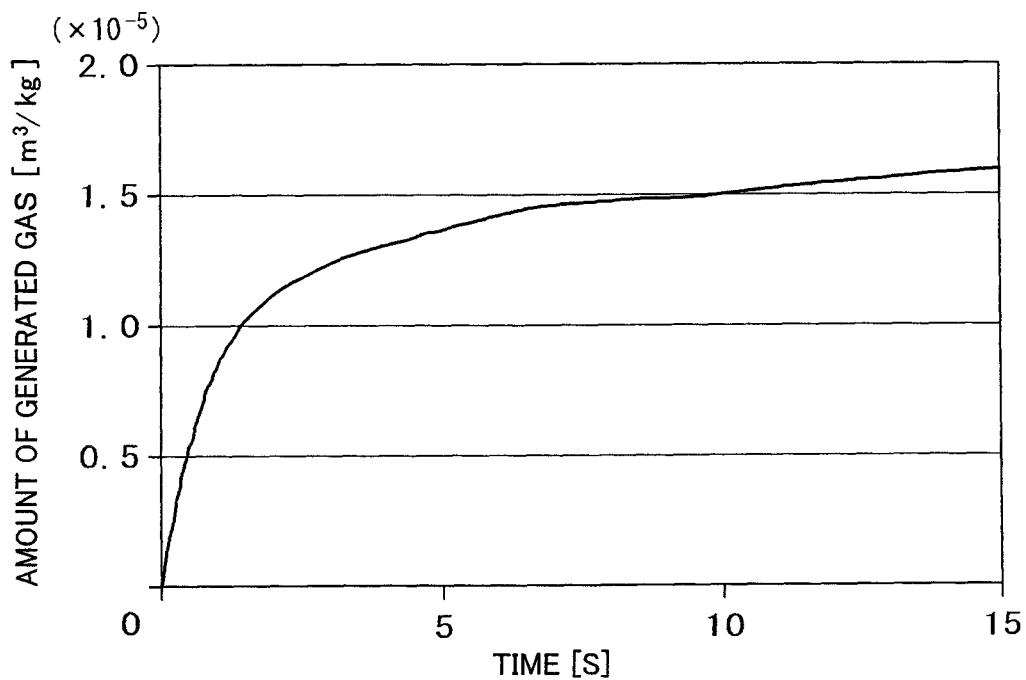
FIG. 9 is a graph expressing a time-sequential change in an amount of gas generated from the resin material, porous material, and solid member in the analytic example 1.
Figure 11:
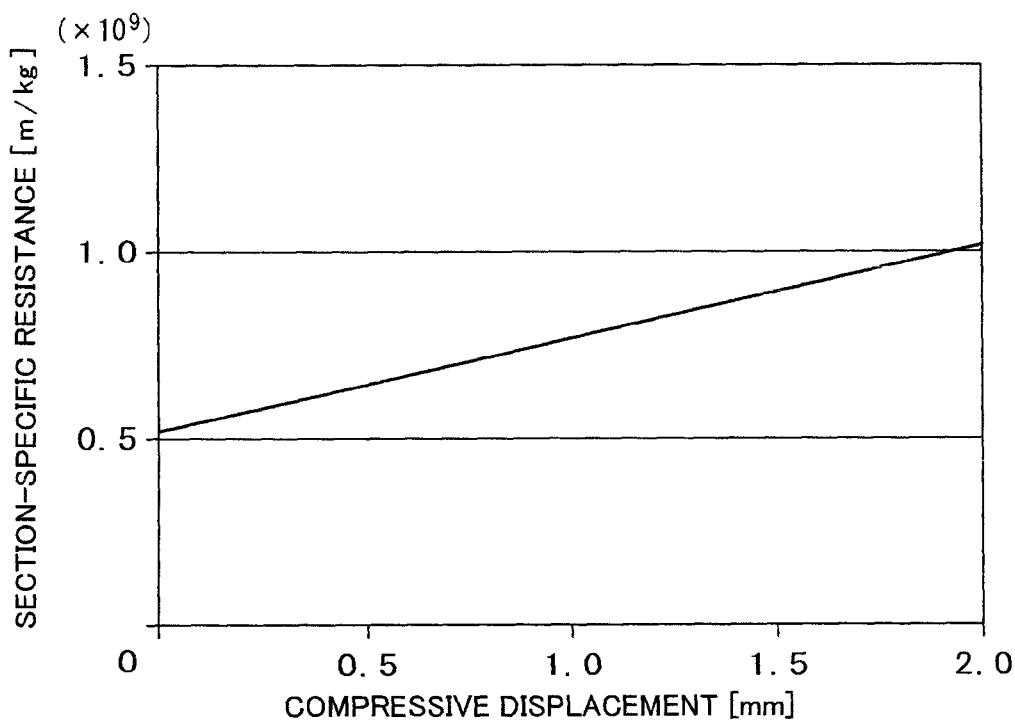
FIG. 11 is a graph expressing a relationship between the cross-sectional specific resistance and compressive displacement to be established when the porous material is compressed in the analytic example 1.

FIG. 8 shows a temporal change in a force to be applied to the press 1. FIG. 9 shows a volume per unit volume of gas generated from the solid member 4, resin material 2, and porous material 3. FIG. 10 shows a relationship between a repulsive force of the porous material 3 and a compressive displacement thereof. A compressive force acting on the resin material 2 is obtained as a difference between the force applied to the press 1 shown in FIG. 8 and the repulsive force of the porous material 3 shown in FIG. 10. The cross-sectional specific resistance takes on the same value in three directions of x, y, and z directions. A value of a change in the cross-sectional specific resistance with respect to the compressive displacement, which is shown in FIG. 11, is inputted. After all data items are inputted, calculation is performed according to the flowchart of FIG. 4.

Figure 12:
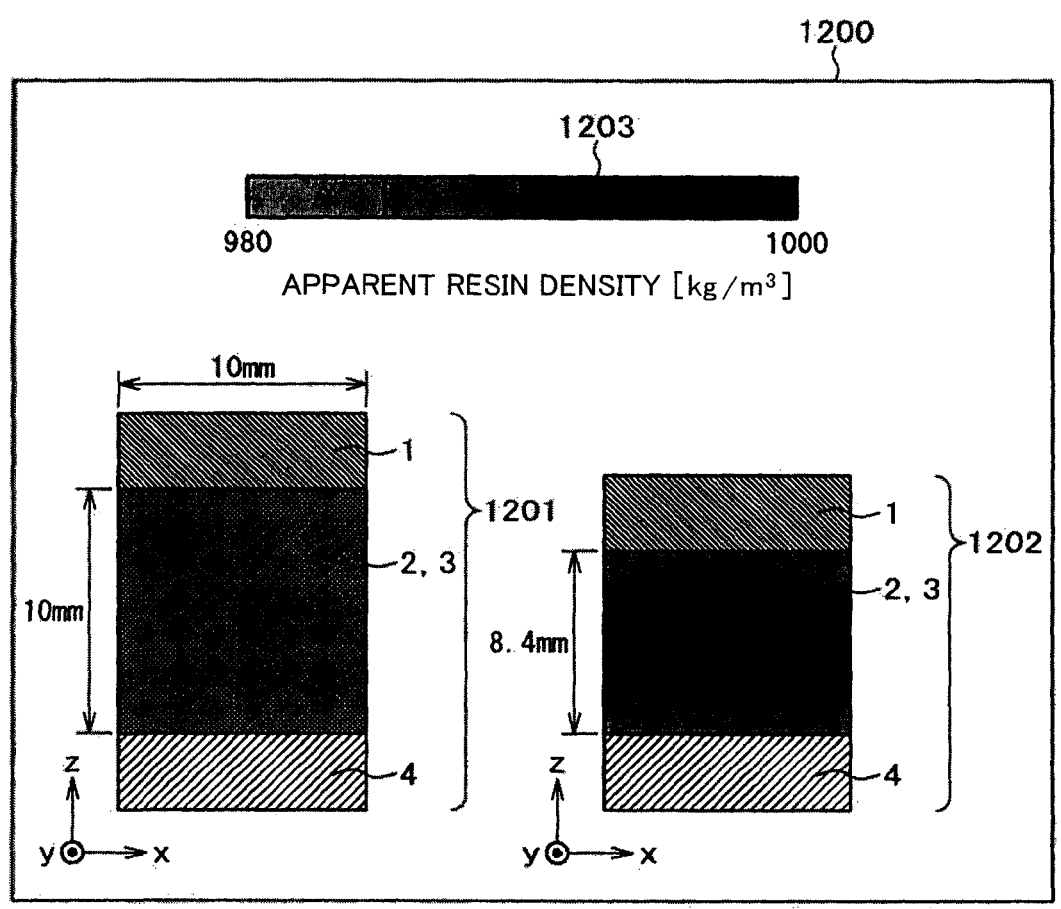
FIG. 12 is a front view of a screen on which a result of analysis performed on a change in an apparent resin density in the analytic example 1.

FIG. 12 shows an example of a screen image 1200 that is displayed on the display unit 11 of the computer 10 and that displays a change in the shape and an apparent-resin density distribution on an xz plane of the porous material 3, in a condition of being filled with the resin material 2, which is obtained from of the calculation. Herein, a field 1201 displays a state attained prior to molding, and a field 1202 displays a state attained after completion of molding. A field 1203 displays a change in display dependent on an apparent resin density. The porous material 3 is deformed due to heating and compression, and the apparent resin densities in parts of the porous material 3 close to the press 1 and solid member 4 respectively are decreased due to generation of gas. This is because although the temperature rises near the top and bottom of the porous material 3 which are in contact with the press 1 and solid member 4 respectively and the temperature rises, heat conducts slowly diminishes and the apparent resin density goes up in the middle portion of the porous material 3.

Figure 13:
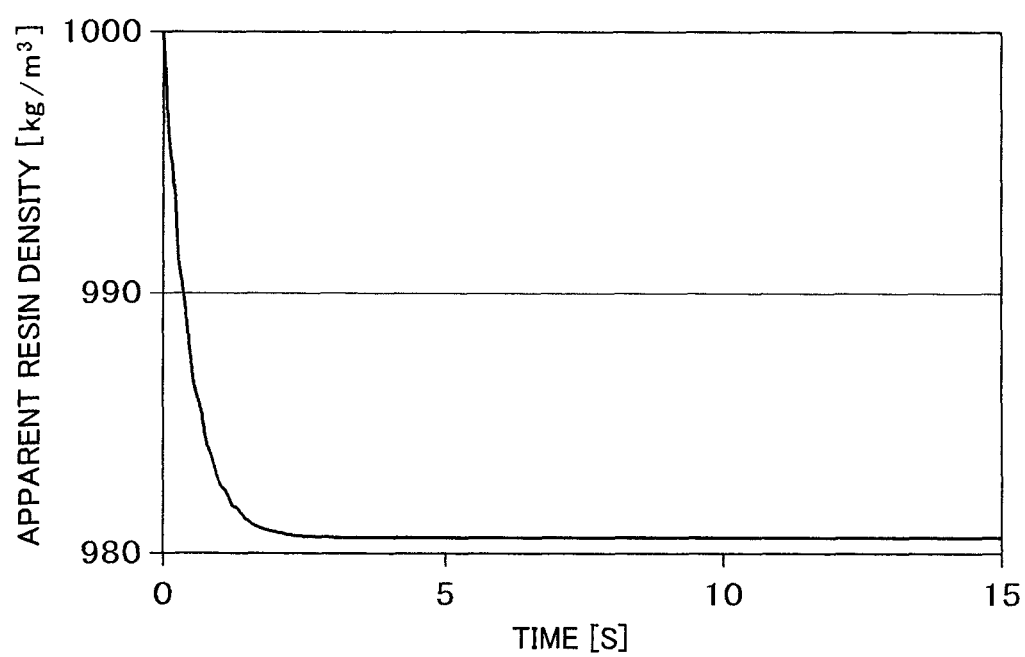
FIG. 13 is a graph expressing a result of analysis performed on a temporal change in the apparent resin density in the analytic example 1.
Figure 14:
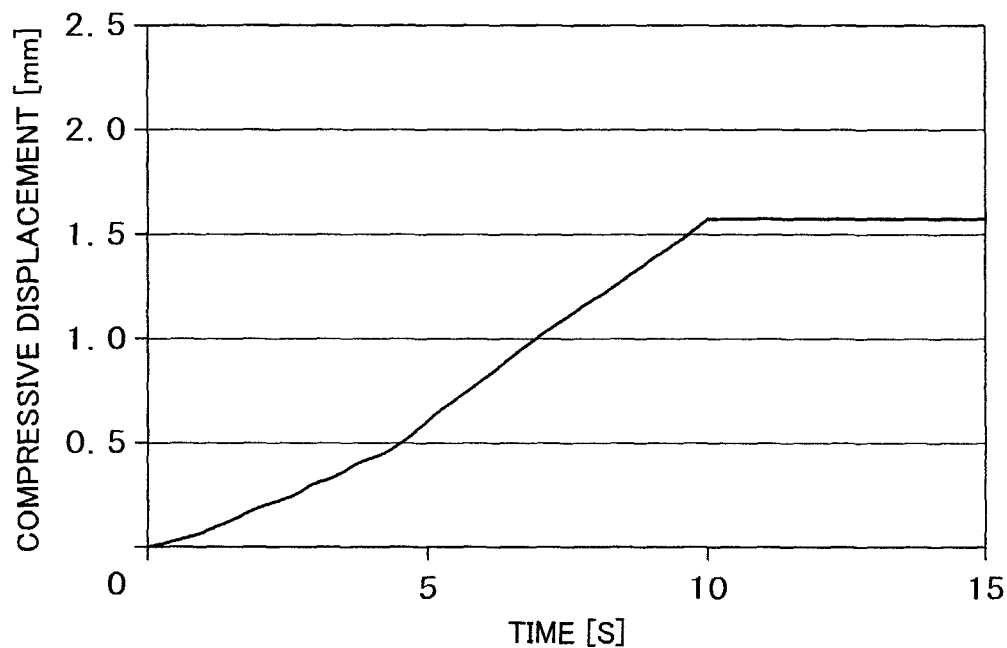
FIG. 14 is a graph expressing a result of analysis performed on a temporal change in the compressive displacement in the analytic example 1.

FIG. 13 shows a temporal change in an apparent resin density in part of the porous material 3 close to the press 1 or solid member 4. A tendency of decrease of a resin density and a tendency of increase of an amount of generated gas shown in FIG. 9 are consistent with each other. FIG. 14 shows a temporal change in a compressive displacement of the porous material 3. After 10 sec elapses, the compressive displacement takes on a constant value. This is because the repulsive force of the porous material 3 gets larger than a force applied to the press 1.

By analyzing the behavior of voids in a resin as mentioned above, modification of a drying process that precedes impregnation with a resin, modification of conditions for a resin heating and curing process, and changing the materials of the porous material and solid member respectively, which are carried out for the purpose of minimizing the production of voids in the resin due to gas generated from the solid member 4, porous material 3, and resin material 2 and to sustain quality, can be achieved shortly during analysis.

Embodiment 2

Figure 15:
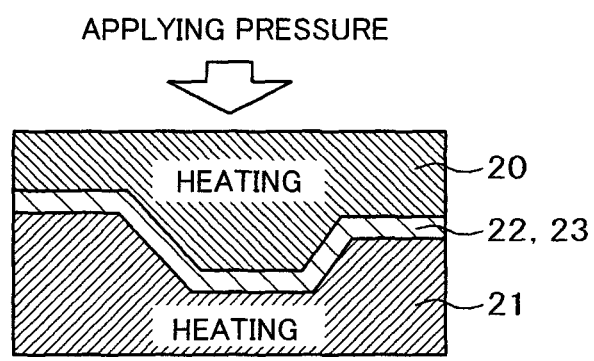
FIG. 15 is a sectional diagram of upper and lower molds and a porous material sandwiched between the molds showing an example of a molding method for a fiber reinforced plastic (FRP) product in accordance with an embodiment 2.

Next, an example of application to fiber reinforced plastic (FRP) molding will be described below. FIG. 15 shows an example of FRP molding. A porous material 23 filled with a resin material 22 is interposed between an upper mold 20 and a lower mold 21, heated with a pressure applied thereto, and thus molded. Herein, as the porous material 23, a glass fiber or a carbon fiber may be adopted. The resin material 22 may be a thermosetting resin such as an epoxy resin or a phenol formaldehyde resin or a thermoplastic resin such as polycarbonate or polystyrene. Differences from the example of molding of an insulation layer described in the embodiment 1 lie in that a member equivalent to the solid member 4 that is one of gas generation sources is excluded, and that gas is not generated from any layer other than the layers of the resin material 22 and porous material 23.

Figure 4:
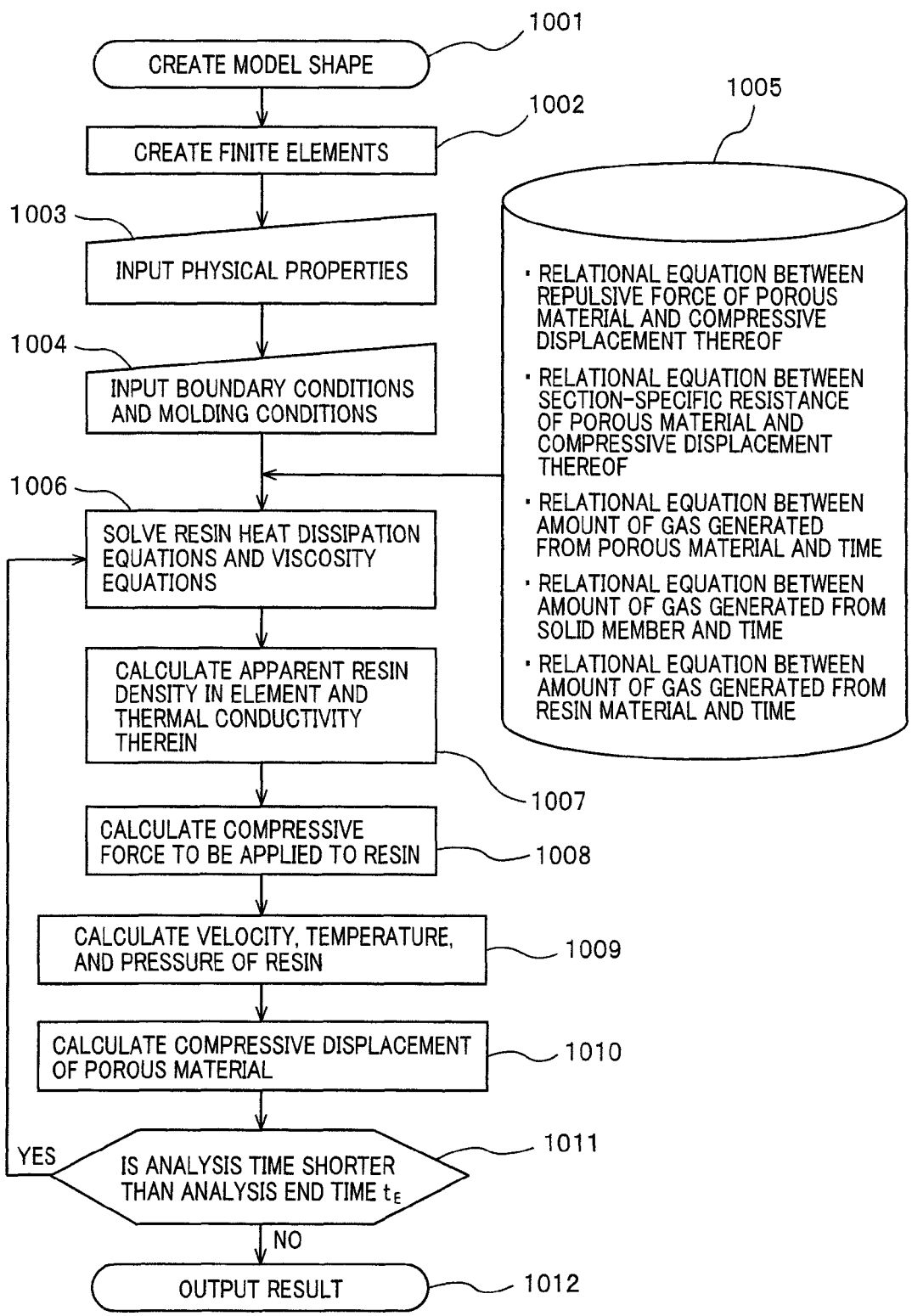
FIG. 4 is a flowchart describing a procedure of analysis processing in accordance with an embodiment 1.

An analysis program is executed along with the same steps as those described in conjunction with the flowchart in FIG. 4 of the embodiment 1. Since gas is not generated from the lower mold 21 equivalent to the solid member 4, when a database is inputted at step 1005, inputting of a relationship equation between an amount of gas generated from the solid member and a time can be omitted.

In the example, referring to FIG. 4, a description has been made of an analysis flow for a case where a porous material impregnated with a resin is interposed in advance between the upper mold 20 and lower mold 21, and then compressed in order to mold an FRP. The present analysis technique is not limited to the case, but can be applied to a case where after only a porous material is put in molds, the porous material is impregnated with a resin, and heated and cured, or in other words, the porous material is molded without being compressed. In this case, when boundary conditions are inputted at step 1004 in the flowchart of FIG. 4, a force to be applied to the molds and a molds moving velocity are set to zeros. When a database is inputted at step 1005, a relational equation between an amount of gas generated from the porous material 23 and a time, and a relational equation between an amount of gas generated from the resin material and a time are inputted. Calculation of a compressive force, which is applied to a resin, of step 1008, and calculation of a compressive displacement of the porous material 3 of step 1010 are excluded. Nevertheless, analysis can be achieved.

The invention may be embodied in other specific forms without departing from the spirit of essential characteristics thereof. The present embodiments are therefore to be considered in all respects as illustrative and not restrictive, the scope of the invention being indicated by the append claims, rather than by the foregoing description, and all changes which come within the meaning and range of equivalency of the claims are therefore intended to be embraced therein.

The invention claimed is:

1. A method for analyzing growth of a region void of resin in a porous material by using a computer, comprising the steps of:

inputting, into the computer, data of a shape of a porous material filled with a resin material, and dividing, in the computer, the shape of the porous material into three-dimensional finite elements on the basis of the inputted shape data;

inputting, into the computer, physical properties of the porous material filled with the resin material, and boundary conditions including a pressure that is applied to the porous material with molds;

obtaining a resin-density distribution in the porous material divided into the three-dimensional finite elements, by using a computer-implemented fluid analysis using a database obtained by experimentally measuring, in advance: a temporal change in a volume of gas generated from the resin material and porous material during heating, changes in a compressive force and compressive displacement respectively occurring when the porous material impregnated with the resin is compressed, and a change in a flow resistance of the resin; and comprehensively graphing production, growth, and distribution of voids deriving from gas generation, on the basis of an apparent resin-density distribution in each of the obtained three-dimensional finite elements;

wherein the computer-implemented fluid analysis includes the following apparent resin density equation concerning a finite element of the porous material:

$$\rho_A = \rho_r - \frac{(\rho_r - \rho_g) \cdot V_g}{f(h) \cdot V_m};$$

wherein $\rho_A$ denotes apparent resin density in a finite element, $\rho_r$ denotes a density of the resin material, $\rho_g$ denotes a gas density, and $V_g$ denotes a gas-occupied volume of each finite element, $V_m$ denotes a total volume of the finite element of the porous material, f denotes an aperture ratio of the porous material, and h denotes a compressive displacement of the porous material.

2. The method for analyzing growth of a region void of resin in a porous material by using a computer according to claim 1, wherein the production, growth, and distribution of voids deriving from gas generation are comprehensively graphed by displaying, on a screen, a graph of the obtained apparent resin-density distribution in each of the three-dimensional finite elements.

3. The method for analyzing growth of a region void of resin in a porous material by using a computer according to claim 1, wherein the boundary conditions including a pressure to be applied to the porous material further include: an initial temperature and initial aperture ratio of the porous material, an initial temperature and initial pressure of the resin material, and a temperature change and initial moving velocity of the molds.

4. The method for analyzing growth of a region void of resin in a porous material by using a computer according to claim 1, wherein the inputted physical properties of the porous material filled with the resin material include:

a density, thermal conductivity, and specific heat of the resin material;

an aperture ratio and cross-sectional specific resistance of the porous material;

a density, thermal conductivity, and specific heat of the porous material; and a density, thermal conductivity, and specific heat of gas generated from the porous material.

5. The method for analyzing growth of a region void of resin in a porous material by using a computer according to claim 1, wherein the database further contains: data of a change in a cross-sectional specific resistance occurring when the porous material is compressed, and data items of a repulsive force and compressive displacement respectively of the porous material observed when the porous material is compressed.

6. The method for analyzing growth of a region void of resin in a porous material by using a computer according to claim 1, wherein the computer-implemented fluid analysis is executed in the computer by using a flow resistance equation which expresses a flow resistance of the porous material as a function of at least a cross-sectional specific resistance and a resin viscosity, and a resin viscosity equation that expresses the resin viscosity as a function of at least a resin temperature.

7. The method for analyzing growth of a region void of resin in a porous material by using a computer according to claim 1, wherein the computer-implemented fluid analysis includes the following heat dissipation equations concerning the resin material:

$$\frac{dA}{dt} = (k_1 + k_2 A^M)(1 - A)^N;$$

$$A = \frac{Q}{Q_a};$$

$$\frac{dQ}{dt} = Q_0(k_1(T) + k_2(T) \cdot A^M)(1 - A)^N;$$

$$k_1 = k_a \exp\left(-\frac{l_1}{T}\right); \text{ and}$$

$$k_2 = k_b \exp\left(-\frac{l_2}{T}\right);$$

wherein, A denotes a reaction rate, t denotes an amount of time, T denotes a temperature, dA/dt denotes a reaction velocity, $k_1$ and $k_2$ denote coefficients that are functions of temperature, M, N, $k_a$, $k_b$, $l_1$, and $l_2$ denote material-specific constants, Q denotes a heat quantity dissipated over a given time period, dQ/dt denotes a heat quantity dissipation rate, and $Q_0$ denotes a total heat quantity dissipated by termination of reaction.

8. The method for analyzing growth of a region void of resin in a porous material by using a computer according to claim 7, wherein the computer-implemented fluid analysis includes the following viscosity equations concerning the resin material:

$$\eta(t, T) = \eta_0(T)\left(\frac{1 + t/t_g(T)}{1 - t/t_g(T)}\right)^{D(T)};$$

$$\eta_0(T) = a\exp\left(\frac{b}{T}\right);$$

$$t_g(T) = d\exp\left(\frac{e}{T}\right); \text{ and}$$

$$D(T) = \frac{i}{T} - j;$$

wherein, $\eta$ denotes a viscosity, $\eta_0$ denotes an initial viscosity, $t_g$ denotes a gelation time, t denotes an amount of time, T denotes a temperature, D denotes a coefficient that is a function of temperature, and a, b, d, e, i, and j denote material-specific constants, and wherein $\eta(t, T)$ is a function of at least the resin temperature.

9. The method for analyzing growth of a region void of resin in a porous material by using a computer according to claim 8, wherein the computer-implemented fluid analysis includes the following flow resistance change equation concerning the porous material:

$$K(t, T, h) = \eta(t, T) \cdot \beta(h)$$

wherein, K denotes a flow resistance, $\beta$ denotes a cross-sectional specific resistance, h denotes a compressive displacement of the porous material, t denotes an amount of time, T denotes a temperature, and $\eta$ denotes a viscosity;

wherein in calculating at an initial time increment $\Delta t1$, $\beta$ is set to an initial value; and wherein the cross-sectional specific resistance $\beta$ can be independently designated for three mutually orthogonal directions.

10. The method for analyzing growth of a region void of resin in a porous material by using a computer according to claim 9, wherein the computer-implemented fluid analysis includes the following gas volume equations concerning the porous material:

$$V_g = v_{g1} \cdot \rho_p \cdot (1 - f(h)) \cdot V_m;$$

$$V_g' = V_g \cdot g_1(\eta) \cdot g_2(P_i) \cdot g_3(\beta);$$

$$g_1(\eta) = \alpha_1 \exp\left(\frac{\alpha_2}{\eta}\right);$$

$$g_2(P_i) = \alpha_3 \exp\left(\frac{\alpha_4}{P_i}\right);$$

$$g_3(\beta) = \alpha_5 \exp\left(\frac{\alpha_6}{\beta}\right); \text{ and}$$

$$f(h) = \frac{H \cdot f_0 - h}{H - h};$$

wherein, $\rho_p$ denotes a density of the porous material, f denotes an aperture ratio of the porous material, h denotes a compressive displacement of the porous material, $V_g$ denotes a gas-occupied volume of a finite element of the porous material, and $V_m$ denotes a total volume of the finite element of the porous material;

wherein, $V_g'$ denotes a corrected gas-occupied volume, $\eta$ denotes a viscosity, $P_i$ denotes a difference between the resin pressure near a void and internal gas pressure, $\beta$ denotes a cross-sectional specific resistance;

wherein $\alpha 1$, $\alpha 2$, $\alpha 3$, $\alpha 4$, $\alpha 5$, and $\alpha 6$ denote constants designated for respective functions, determined by behavior analysis of a sole void; and wherein, H denotes an initial thickness of the porous material, and $f_0$ denotes an initial aperture ratio of the porous material.

11. The method for analyzing growth of a region void of resin in a porous material by using a computer according to claim 10, wherein the computer-implemented fluid analysis includes the following resin conductivity equation, concerning a finite element of the porous material:

$$\lambda = \lambda_0 \left(\frac{\rho_A}{\rho_r}\right)^E;$$

wherein $\rho_A$ denotes apparent resin density in a finite element, $\rho_r$ denotes a density of the resin material, $\lambda_0$ denotes an initial thermal conductivity of the resin material, and E denotes a material-specific constant.

12. The method for analyzing growth of a region void of resin in a porous material by using a computer according to claim 11, wherein the computer-implemented fluid analysis includes the following equations of continuity, motion, and energy conservation, respectively:

$$\nabla \cdot u = 0;$$

$$\frac{\partial u}{\partial t} + u \cdot \nabla u = -\frac{1}{\rho_A} \nabla P + \frac{\eta(t, T)}{\rho_A} \nabla^2 u + G - K(t, T, h) \cdot u; \text{ and}$$

$$\rho_A C \left(\frac{\partial T}{\partial t} + u \cdot \nabla T\right) = \lambda \nabla^2 + \rho_A \frac{dQ}{dt} + \eta \gamma^2$$

where u denotes a velocity, t denotes a time, T denotes a temperature, P denotes a pressure, $\rho_A$ denotes an apparent resin density in a finite element, $\eta$ denotes a viscosity, G denotes a gravitational acceleration, C denotes a specific heat, $\lambda$ denotes a thermal conductivity, Q denotes a heat quantity, y denotes a shear velocity, and K denotes a flow resistance of the porous material 3.

13. A method for analyzing growth of a region void of resin in a porous material by using a computer, comprising the steps of:

dividing, in the computer, a shape of a porous material filled with a resin material into three-dimensional finite elements;

inputting, into the computer, physical properties of the porous material filled with the resin material, and boundary conditions including a pressure that is applied to the porous material with molds;

obtaining a resin-density distribution in the porous material divided into the three-dimensional finite elements, by using a computer-implemented fluid analysis using a database obtained by experimentally measuring, in advance: a temporal change in a volume of gas generated from the resin material during heating of the porous material with the molds; and displaying, on a screen, the obtained resin-density distribution in the porous material divided into the three-dimensional finite elements, side by side with a resin-density distribution in the porous material obtained before the pressure is applied with the molds;

wherein the computer-implemented fluid analysis includes the following apparent resin density equation concerning a finite element of the porous material:

$$\rho_A = \rho_r - \frac{(\rho_r - \rho_g) \cdot V_g}{f(h) \cdot V_m};$$

wherein $\rho_A$ denotes apparent resin density in a finite element, $\rho_r$ denotes a density of the resin material, $\rho_g$ denotes a gas density, and $V_g$ denotes a gas-occupied volume of each finite element, $V_m$ denotes a total volume of the finite element of the porous material, f denotes an aperture ratio of the porous material, and h denotes a compressive displacement of the porous material.

14. The method for analyzing growth of a region void of resin in a porous material by using a computer according to claim 13, wherein the inputted physical properties of the porous material filled with the resin material include:

a density, thermal conductivity, and specific heat of the resin material;

an aperture ratio and cross-sectional specific resistance of the porous material;

a density, thermal conductivity, and specific heat of the porous material; and a density, thermal conductivity, and specific heat of gas generated from the porous material.

15. The method for analyzing growth of a region void of resin in a porous material by using a computer according to claim 13, wherein the database further contains: data of a change in a cross-sectional specific resistance occurring when the porous material is compressed, and data items of a repulsive force and compressive displacement respectively of the porous material observed when the porous material is compressed.

16. The method for analyzing growth of a region void of resin in a porous material by using a computer according to claim 13, wherein the boundary conditions including the pressure that is applied to the porous material with the molds further include: an initial temperature and initial aperture ratio of the porous material, an initial temperature and initial pressure of the resin material, and a temperature change and initial moving velocity of the molds.

17. The method for analyzing growth of a region void of resin in a porous material by using a computer according to claim 13, wherein the computer-implemented fluid analysis is executed in the computer by using a flow resistance equation which expresses a flow resistance of the porous material as a function of at least a cross-sectional specific resistance and a resin viscosity, and a resin viscosity equation which expresses the resin viscosity as a function of as least a resin temperature.

18. The method for analyzing growth of a region void of resin in a porous material by using a computer according to claim 17, wherein for the computer-implemented fluid analysis, a flow resistance of the porous material is expressed by a function of a cross-sectional specific resistance and a resin viscosity, a change in the flow resistance deriving from heating and compression of the porous material containing the resin material is calculated, and a volume of gas generated from the porous material and resin material is calculated.

19. The method for analyzing growth of a region void of resin in a porous material by using a computer according to claim 13, wherein the computer-implemented fluid analysis includes the following heat dissipation equations concerning the resin material:

$$\frac{dA}{dt} = (k_1 + k_2 A^M)(1-A)^N;$$

$$A = \frac{Q}{Q_a};$$

$$\frac{dQ}{dt} = Q_0(k_1(T) + k_2(T) \cdot A^M)(1-A)^N;$$

$$k_1 = k_a \exp\left(-\frac{l_1}{T}\right); \text{ and}$$

$$k_2 = k_b \exp\left(-\frac{l_2}{T}\right);$$

wherein, A denotes a reaction rate, t denotes an amount of time, T denotes a temperature, dA/dt denotes a reaction velocity, $k_1$ and $k_2$ denote coefficients that are functions of temperature, M, N, $k_a$, $k_b$, $l_1$, and $l_2$ denote material-specific constants, Q denotes a heat quantity dissipated over a given time period, dQ/dt denotes a heat quantity dissipation rate, and $Q_0$ denotes a total heat quantity dissipated by termination of reaction.

20. The method for analyzing growth of a region void of resin in a porous material by using a computer according to claim 19, wherein the computer-implemented fluid analysis includes the following viscosity equations concerning the resin material:

$$\eta(t, T) = \eta_0(T)\left(\frac{1 + t/t_g(T)}{1 - t/t_g(T)}\right)^{D(T)};$$

$$\eta_0(T) = a\exp\left(\frac{b}{T}\right);$$

$$t_g(T) = d\exp\left(\frac{e}{T}\right); \text{ and}$$

$$D(T) = \frac{i}{T} - j;$$

wherein, $\eta$ denotes a viscosity, $\eta_0$ denotes an initial viscosity, $t_g$ denotes a gelation time, t denotes an amount of time, T denotes a temperature, D denotes a coefficient that is a function of temperature, and a, b, d, e, i, and j denote material-specific constants, and wherein the temperature T used in the equation to determine $\eta(t, T)$ is a function of at least the resin temperature.

21. The method for analyzing growth of a region void of resin in a porous material by using a computer according to claim 20, wherein the computer-implemented fluid analysis includes the following flow resistance change equation concerning the porous material:

$$K(t,T,h) = \eta(t,T) \cdot \beta(h)$$

wherein, K denotes a flow resistance, $\beta$ denotes a cross-sectional specific resistance, h denotes a compressive displacement of the porous material, t denotes an amount of time, T denotes a temperature, and $\eta$ denotes a viscosity;

wherein in calculating at an initial time increment $\Delta t1$, $\beta$ is set to an initial value; and wherein the cross-sectional specific resistance $\beta$ can be independently designated for three mutually orthogonal directions.

22. The method for analyzing growth of a region void of resin in a porous material by using a computer according to claim 21, wherein the computer-implemented fluid analysis includes the following gas volume equations concerning the porous material:

$$V_g = v_{g1} \cdot \rho_p \cdot (1 - f(h)) \cdot V_m;$$

$$V_g' = V_g \cdot g_1(\eta) \cdot g_2(P_i) \cdot g_3(\beta);$$

$$g_1(\eta) = \alpha_1 \exp\left(\frac{\alpha_2}{\eta}\right);$$

$$g_2(P_i) = \alpha_3 \exp\left(\frac{\alpha_4}{P_i}\right);$$

$$g_3(\beta) = \alpha_5 \exp\left(\frac{\alpha_6}{\beta}\right); \text{ and}$$

$$f(h) = \frac{H \cdot f_0 - h}{H - h};$$

wherein, $\rho_p$ denotes a density of the porous material, f denotes an aperture ratio of the porous material, h denotes a compressive displacement of the porous material, $V_g$ denotes a gas-occupied volume of a finite element of the porous material, and $V_m$ denotes a total volume of the finite element of the porous material;

wherein, $V_g'$ denotes a corrected gas-occupied volume, $\eta$ denotes a viscosity, $P_i$ denotes a difference between the resin pressure near a void and internal gas pressure, $\beta$ denotes a cross-sectional specific resistance;

wherein $\alpha1$, $\alpha2$, $\alpha3$, $\alpha4$, $\alpha5$, and $\alpha6$ denote constants designated for respective functions, determined by behavior analysis of a sole void; and wherein, H denotes an initial thickness of the porous material, and $f_0$ denotes an initial aperture ratio of the porous material.

23. The method for analyzing growth of a region void of resin in a porous material by using a computer according to claim 22, wherein the computer-implemented fluid analysis includes the following apparent resin density equation and resin conductivity equation, concerning a finite element of the porous material:

$$\rho_A = \rho_r - \frac{(\rho_r - \rho_g) \cdot V_g}{f(h) \cdot V_m}; \text{ and}$$

$$\lambda = \lambda_0 \left(\frac{\rho_A}{\rho_r}\right)^E;$$

wherein $\rho_A$ denotes apparent resin density in a finite element, $\rho_r$ denotes a density of the resin material, $\rho_g$ denotes a gas density, and $V_g$ denotes a gas-occupied volume of each finite element, $V_m$ denotes a total volume of the finite element of the porous material, f denotes an aperture ratio of the porous material, and h denotes a compressive displacement of the porous material; and wherein, $\lambda_0$ denotes an initial thermal conductivity of the resin material, and E denotes a material-specific constant.

24. The method for analyzing growth of a region void of resin in a porous material by using a computer according to claim 23, wherein the computer-implemented fluid analysis includes the following equations of continuity, motion, and energy conservation, respectively:

$$\nabla \cdot u = 0;$$

$$\frac{\partial u}{\partial t} + u \cdot \nabla u = -\frac{1}{\rho_A} \nabla P + \frac{\eta(t, T)}{\rho_A} \nabla^2 u + G - K(t, T, h) \cdot u; \text{ and}$$

$$\rho_A C \left(\frac{\partial T}{\partial t} + u \cdot \nabla T\right) = \lambda \nabla^2 + \rho_A \frac{dQ}{dt} + \eta \gamma^2$$

where u denotes a velocity, t denotes a time, T denotes a temperature, P denotes a pressure, $\rho_A$ denotes an apparent resin density in a finite element, $\eta$ denotes a viscosity, G denotes a gravitational acceleration, C denotes a specific heat, $\lambda$ denotes a thermal conductivity, Q denotes a heat quantity, y denotes a shear velocity, and K denotes a flow resistance of the porous material 3.

* * * * *